United States Patent
Huang et al.

(10) Patent No.: US 6,509,998 B2
(45) Date of Patent: Jan. 21, 2003

(54) TUNABLE MULTI-CHANNEL OPTICAL ATTENUATOR (TMCOA)

(75) Inventors: Liji Huang, San Jose, CA (US); Jian Li, Sunnyvale, CA (US); Naiqian Han, Sunnyvale, CA (US); James Yang, Stanford, CA (US)

(73) Assignee: INTPAX, Inc., Cupertino, CA (US)

( * ) Notice: Subject to any disclaimer, the term of this patent is extended or adjusted under 35 U.S.C. 154(b) by 0 days.

(21) Appl. No.: 09/877,367

(22) Filed: Jun. 7, 2001

(65) Prior Publication Data

US 2002/0054416 A1 May 9, 2002

Related U.S. Application Data (60) Provisional application No. 60/245,454, filed on Nov. 3, 2000, and provisional application No. 60/245,451, filed on Nov. 3, 2000.

(51) Int. Cl.[7] .............................. G02F 1/03; H01S 3/115
(52) U.S. Cl. ..................... 359/245; 359/247; 359/248; 359/290; 359/291; 372/12; 372/20; 372/43
(58) Field of Search .................................. 359/245, 224, 359/247, 248, 290, 291, 295; 372/12, 20, 43, 45

(56) References Cited

U.S. PATENT DOCUMENTS 5,949,571 A * 9/1999 Goossen et al. ............ 359/291
6,324,192 B1 * 11/2001 Tayebati ....................... 372/20

* cited by examiner

*Primary Examiner*—Georgia Epps
*Assistant Examiner*—Tuyen Tra
(74) *Attorney, Agent, or Firm*—Bo-In Lin (57) ABSTRACT

A conductive substrate supports an array of multi-channel optical attenuating devices. Each attenuating device includes a membrane with an optically transparent portion And a flexible support for positioning the optically transparent portion of the membrane spaced from the substrate for defining an air gap. The air gap constitutes a cross-shaped gap-chamber having a horizontally and vertically elongated chambers extended from a central intersection area functioning as an optical active area. A voltage bias circuit applies an electrical bias between the conductive substrate and the membrane to adjust and control an air-gap thickness at the optical active area between the conductive substrate and the membrane. Each of the devices can be manufactured on the same silicon wafer using the same process and can be individually controlled to accommodate different wavelength attenuation at each channel. Production costs, and time and efforts required for aligning the array to optical fibers are also reduced.

17 Claims, 9 Drawing Sheets

Figure 5 ated multiple channel attenuator such that the limitations encountered by current single configuration can be overcome. It is further desirable that the multiple channel attenuators would allow for different attenuation characteristics controllable for each individual channel such that signal transmission in each channel can be flexibly adjusted. This principle is similar to the transmission mode of a Fabry-Perot interferometer. The designed air gap modulation shall meet the requirement. For a specific wavelength, λ, the gap length shall equal to mλ/4 (when m is even the mode shall be anti-reflection, m is odd the mode shall be reflection. In addition, the desirable multi-channel configuration also provides a benefit to significantly reduce the production cost because the channel to channel alignment processes as that required in the conventional optical devices are no longer necessary.

TUNABLE MULTI-CHANNEL OPTICAL ATTENUATOR (TMCOA)

This Application claims a priority date of Nov. 3, 2000 benefited from a previously filed Provisional Patent Applications 60/245,451 and 60/245,454 filed on Nov. 3, 2000 by one of the Applicants of this Formal Patent Application.

BACKGROUND OF THE INVENTION

1. Field of the Invention

This invention relates generally to apparatus and methods for manufacturing optical and photonic devices for fiber optical signal transmission systems. More particularly, this invention is related to configuration and method of manufacturing multiple channel optical and photonic attenuator for use in wide-band optical communication sub-system or system.

2. Description of the Related Art

Recent development of the mechanical anti-reflection switch for implementation as optical modulators is still faced with a technical limitation. The configuration is mostly employed as a single channel device and alignment for more than one channel would be costly wherever multi-channel applications are required for state-of-the-art optical network communication system. The mechanical anti-reflection switch configuration, as will be further described below, be conveniently manufactured by a low-cost silicon-based micro electromechanical systems (MEMS) technique to fulfill the objectives of providing an optical modulator with high production volume and low cost. In a preferred form, this device has a multiple-layer film stack of polysilicon/silicon nitride/polysilicon. The polysilicon layer is doped to function as an electrode layer. A precisely controlled air gap between the film stack and the substrate allows a controllable switching operation of turning the modulator from a reflecting state to an anti-reflecting state. The multi-layer film configuration is controllable with low drive voltage, large optically active area, and excellent performance characteristics over a broad spectral range. The modulator also performs well in many system applications. However, as state-of-the-art wide-band optical communication system now requires a multi-channel buffered subsystem to properly attenuate and redistribute the optical signals, a conventional single channel device cannot satisfy the system requirements to carry out the multiple channel fast attenuation process.

Figure 1:
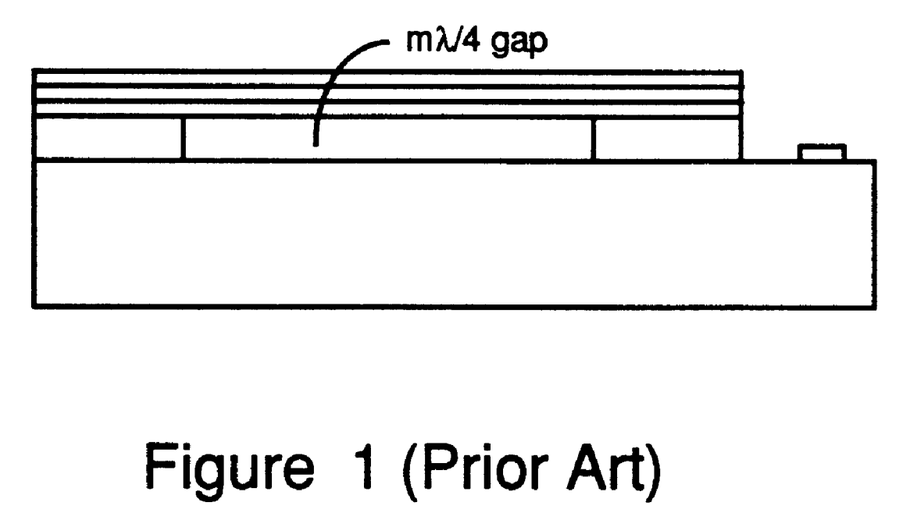
FIG. 1 is a cross sectional view of a conventional single channel attenuator disclosed by a prior art patent.

Based on the principle of the well-known Fabry-Perot interferometer constructed by Charles Fabry and Alfred Perot in 1897, Goossen discloses in U.S. Pat. Nos. 5,943,155 and 5,949,571, entitled "MARS Optical Modulators", a double polysilicon MARS (mechanical antireflection switch) device where the shorting between the lower polysilicon metalization and the silicon substrate is prevented by providing an insulating layer on the surface of the silicon substrate. Goossen teaches a modulator configuration using the reflection modulation of the Fabry-Perot interferometer with improved reliability. The disclosures of these two patents are hereby incorporated as reference in this Application. The configuration disclosed by Goossen as shown in FIG. 1 however is still limited to handle single channel of optical transmissions. For an optical signal transmission system that handles signals distributions between multiple interconnected networks with multiple optical fibers, the configuration of Goossen's disclosures are still insufficient to resolve the limitations encountered by those of ordinary skill in the art.

Therefore, a still need exists in the art in the field of the optical signal transmission systems to provide a configura-

SUMMARY OF THE INVENTION

It is therefore an object of the present invention to provide new and improved configuration and methods for manufacturing multi-channel optical and/or photonic attenuators with each attenuator flexibly controlled by separate control circuits such that flexible multi-channel optical signal transmission can be conveniently carried out. With the new and improved structural and control configurations, the limitations and difficulties of the prior art can be resolved. The present invention also requires only one alignment for all channels and hence significantly reduces the cost in package process. Further, the present invention allows the manufacture of flexibly adjustable number of channels on a single silicon wafer at one time, i.e. a lower number of channels can be diced out from the dies with a higher number of channels.

Another object of the present invention is to provide the multi-channel optical attenuators by using the micro-electromechanical system (MEMS) process. The attenuators are integrated on the silicon wafer substrate providing desired multi-channel attenuation with optimized insertion loss for the optical signals in the optical communication system or sub-system.

Another object of the present invention is to provide an array of multi-channel optical attenuating devices by using the micro-electromechanical system (MEMS) process to form the optical attenuator devices, each with cross-shaped chamber. An optical active area is formed at the center of the cross-shaped chamber to provide high sensitivity adjustment.

Briefly, in a preferred embodiment, this invention discloses an array of multi-channel optical attenuating devices. This array of multi-channel attenuating devices includes a plurality of electro-optical devices support on a conductive substrate. Each of these electro-optical devices includes a membrane having an optically transparent portion. Each of these electro-optical devices further includes a flexible support for positioning the optically transparent portion of the membrane spaced from the substrate for defining an air gap. The air gap constitutes a cross-shaped gap-chamber having a horizontally and vertically elongated chambers extended from a central intersection area. The central intersection area constitutes an optical active area. Each of these electro-optical devices further includes a means for applying an electrical bias between the conductive substrate and the membrane to adjust and control an air-gap thickness at the optical active area between the conductive substrate and the membrane. Each channel in the array can be individually adjusted to accommodate the requirement for the optical network system. For the array of channels, fiber alignment can only apply to any one of the channels in the array and hence the cost of package is significantly reduced.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2A:
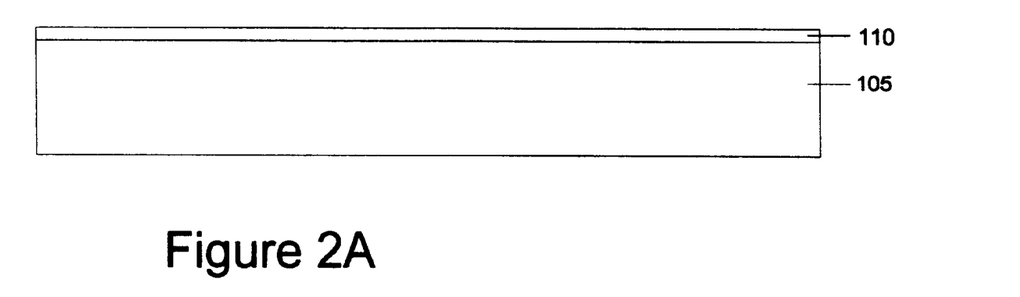
FIGS. 2A to 2L are a series of cross sectional views for showing the manufacturing processes for fabricating an array of attenuator devices of this invention.
Figure 2B:
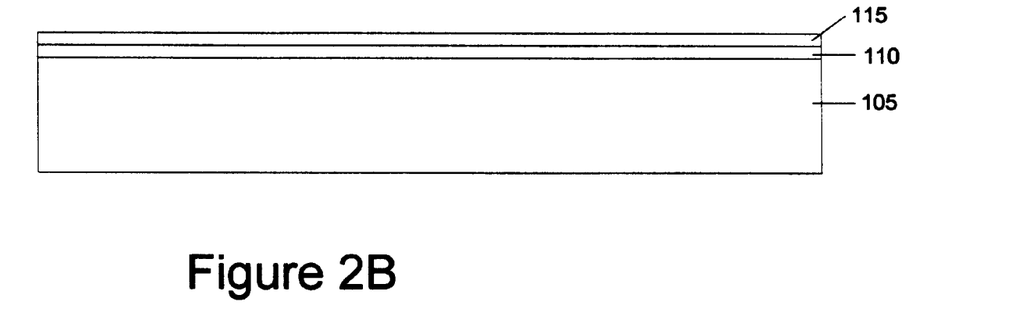
Figure 2C:
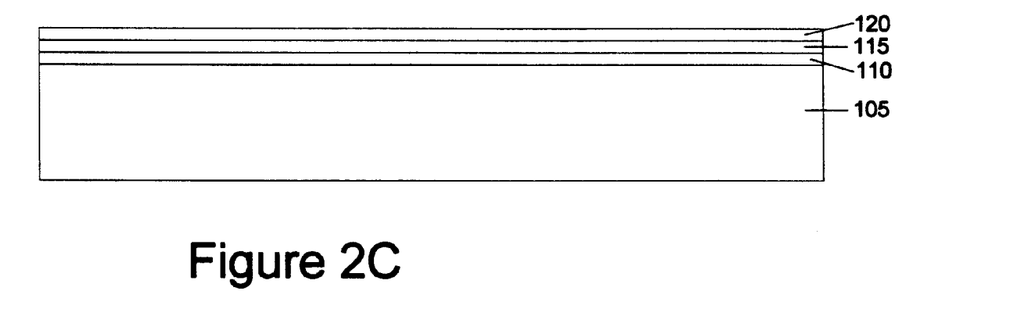
Figure 2D:
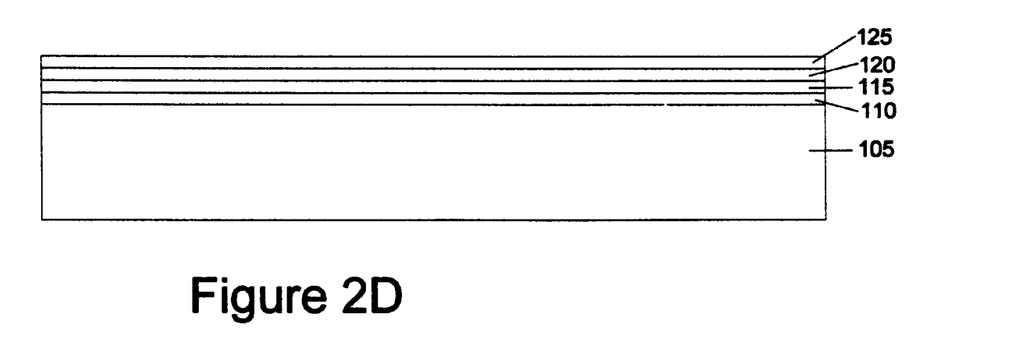
Figure 2E:
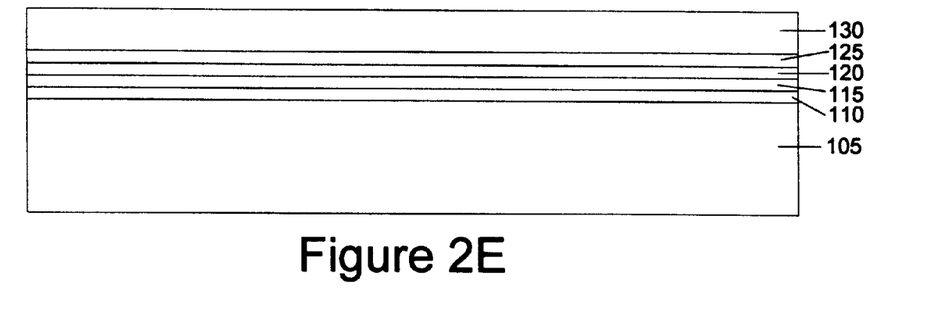
Figure 2F:
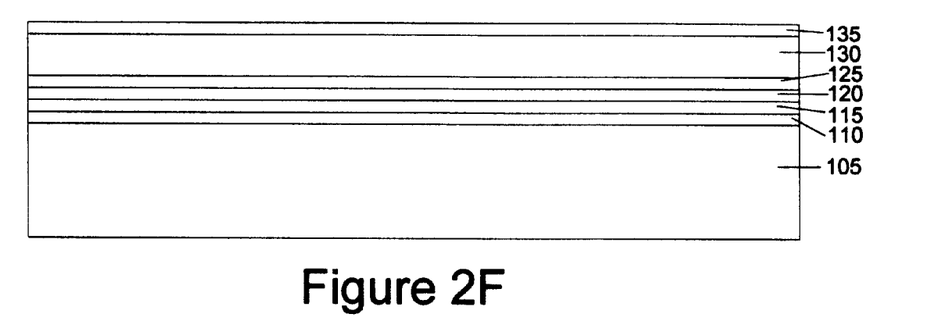
Figure 2G:
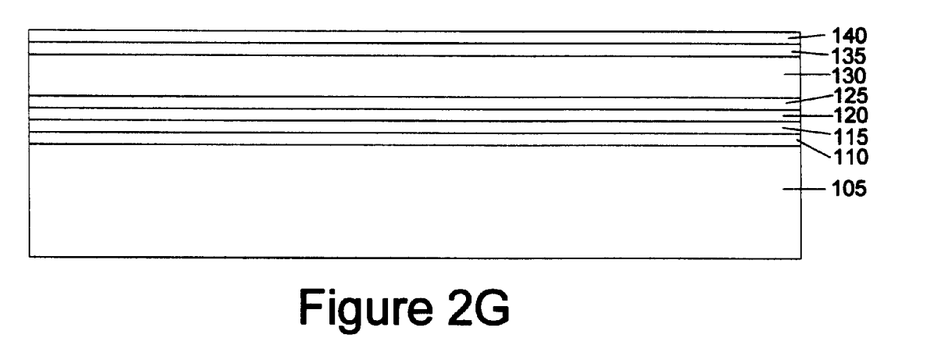
Figure 2H:
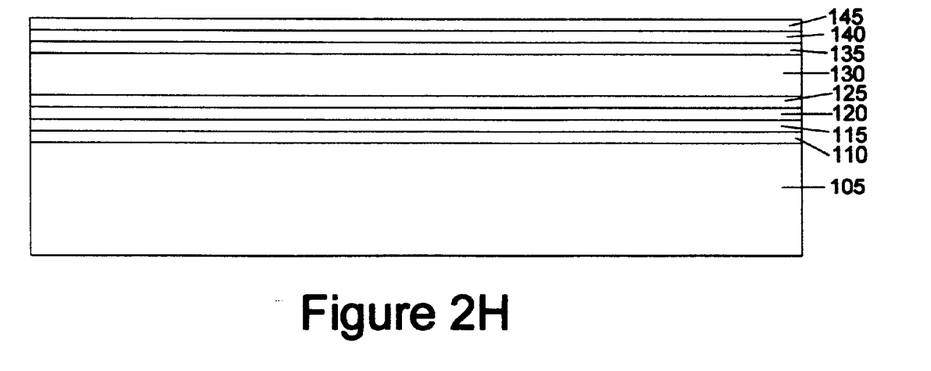
Figure 2I:
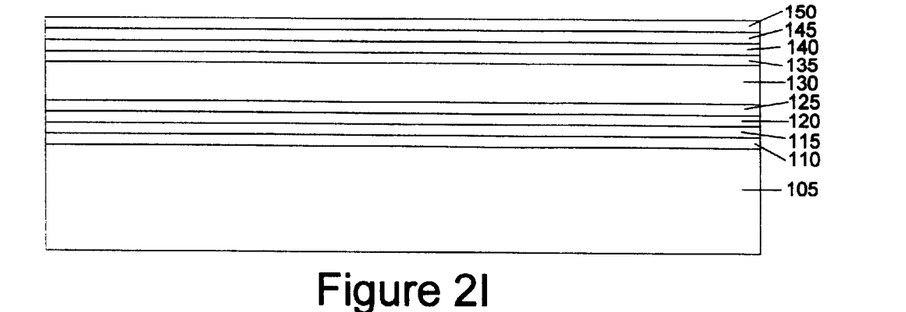
Figure 2J:
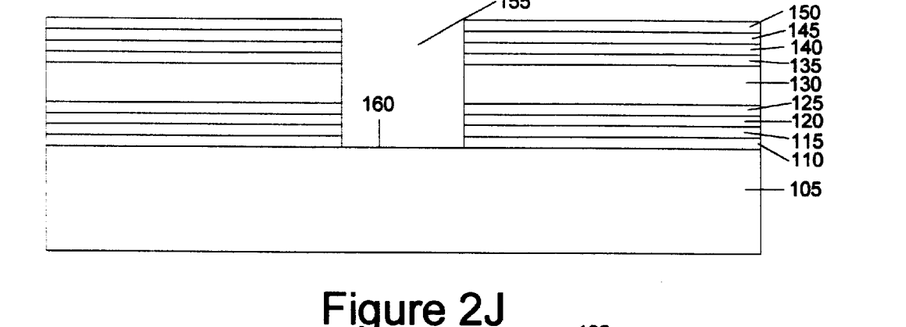
Figure 2K:
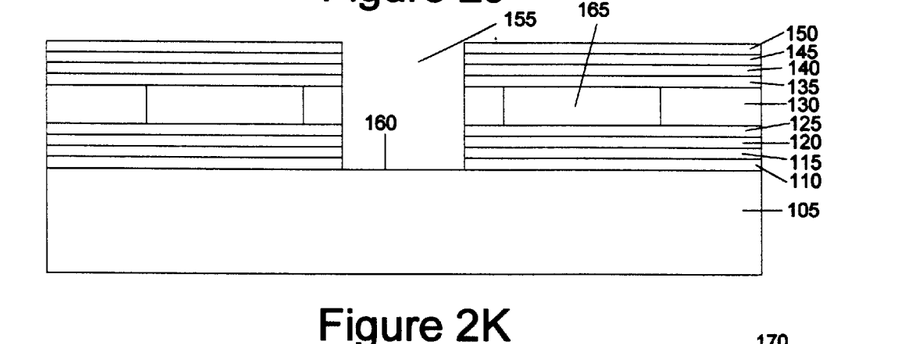
Figure 2L:
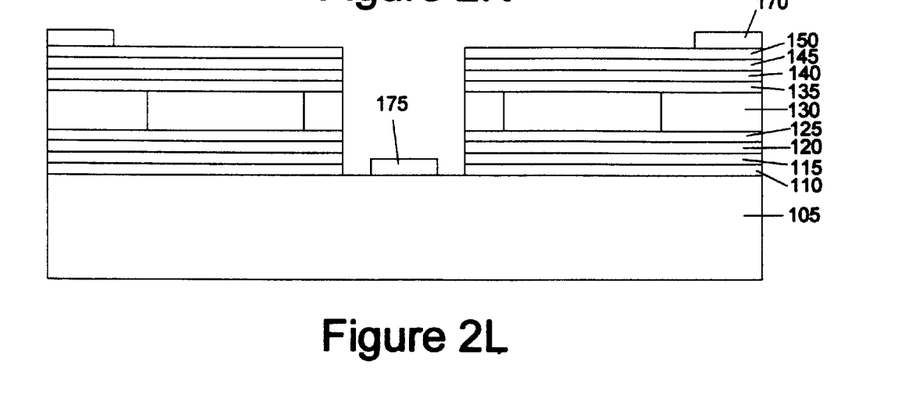

Referring to FIGS. 2A to 2L for a series of cross sectional views and top views for showing the manufacturing process of a multiple channel optical attenuator of this invention that can be implemented in a wide-band optical signal communication system or subsystem. The processes of manufacturing the multi-channel optical attenuator starts, as shown in FIG. 2A, with the deposition of a silicon nitride layer 110 on a top surface of a silicon substrate 105 by applying a chemical vapor deposition (CVD) process. In FIGS. 2B to 2D, a polysilicon layer 115 covered by another silicon nitride layer 120 and another polysilicon layer 125 are formed to top of the silicon nitride layer 110 again by employing chemical vapor deposition (CVD) processes. Referring to FIG. 2E, a phosphorus doped silicate glass (PSG) layer 130 is deposited on to the polysilicon layer 125. Then, as shown in FIGS. 2F to 2I, a silicon nitride layer 135, followed by a polysilicon layer 140, another silicon nitride layer 145 and another polysilicon layer 150 are then deposited on top of the PSG layer 130. In FIG. 2J, an etch process is carried out to open a trench 155 by applying a lithography and reactive ion etch processes to define the bottom electroplate areas 160. Then in FIG. 2K, a photolithography and reactive ion etch processes are first performed to define the membrane structure 165 at the PSG layer 130 under the etch stop. Then, a wet etch process by employing a hydrofluoric (HF) etchant is carried out to undercut the PSG to lift the membrane. In FIG. 2L, an electroplating process is carried out to form the top and bottom electrode pads 170 and 175 respectively to complete the manufacture processes.

Figure 3A:
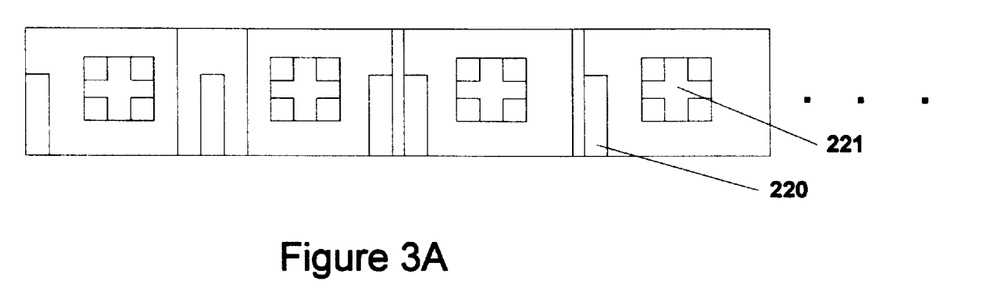
FIGS. 3A and 3B are a top view and side cross sectional view of one-dimensional array of attenuator devices of this invention.
Figure 3B:
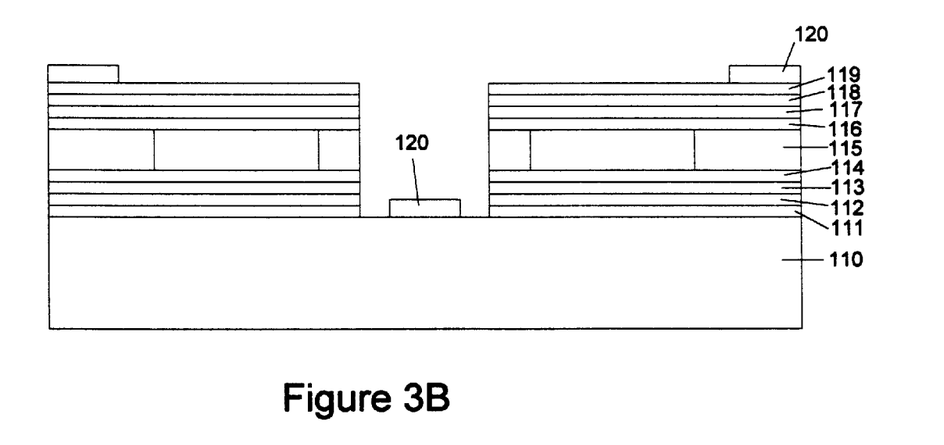
Figure 4A:
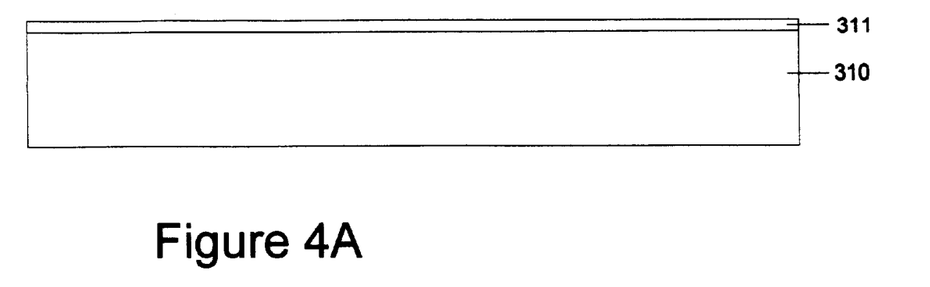
FIGS. 4A to 4L are a series of cross sectional views for showing the manufacturing processes for fabricating an array of attenuator devices of this invention.
Figure 4B:
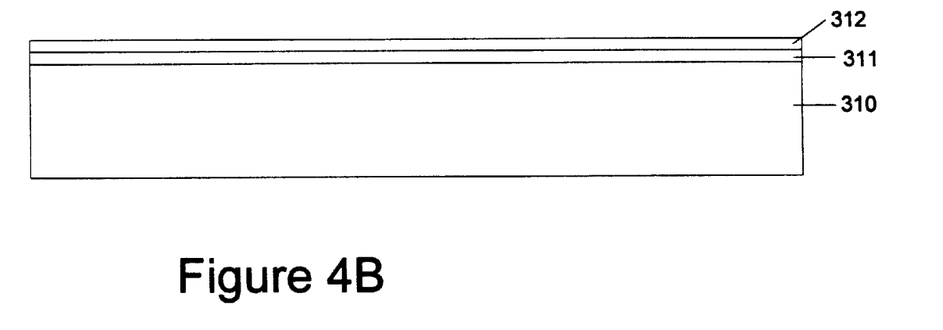

Referring to FIG. 3 for a linear array of multi-channel optical attenuator devices formed with cross-shaped chambers manufactured according to above manufacturing processes. Each of these cross-shaped device has an optical active area 221 disposed at the center of the cross-shaped chamber. Each of these devices further includes an electrode pad 220. FIGS. 4A to 4L illustrate the processing steps for making the multi-channel optical attenuator devices wherein FIG. 4L is a cross sectional view of the layer structure of an optical attenuator. The attenuator device array is supported on a silicon substrate 210. In FIG. 4B, an optical inserting loss reduction layer for reflection enhancement is deposited on conductive silicon substrate 310. The optical insertion loss reduction layer includes two layers of thin films, 311 and 312. These two layers have different reflective index, n, the thin film with a smaller reflective index 311, is deposited on substrate first to reduce insertion loss and to enhance reflection. The thin film physical thickness, t, is determined by the film reflective index, n and wavelength, $\lambda$, of the light for modulation according to the rule of $nt=m\lambda/4$, where m is an odd number. A selection of m=3 is made to achieve near optimal mechanical performance. The films can be made of silicon oxide, or silicon nitride, or silicon oxynitride, or poly-silicon, or amorphous silicon, but preferably poly-silicon 312, and silicon nitride 311.

Figure 4C:
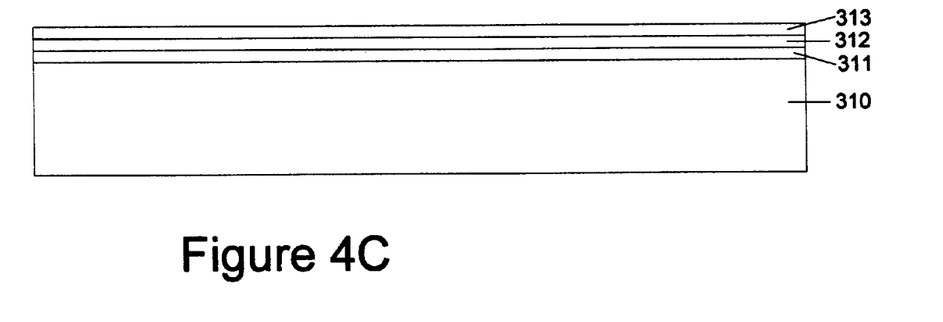
Figure 4D:
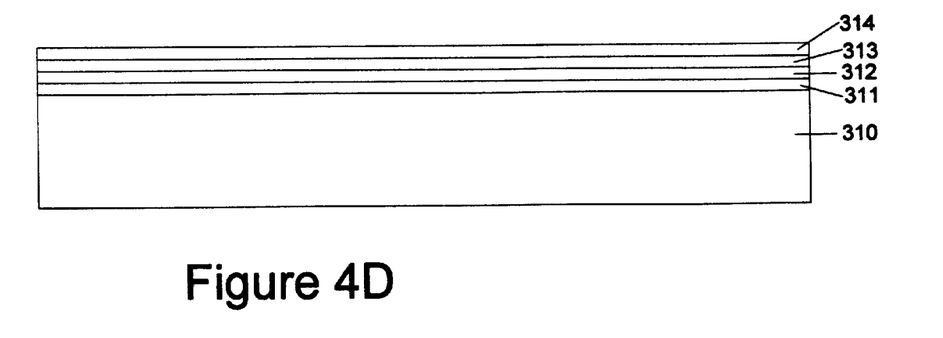
Figure 4E:
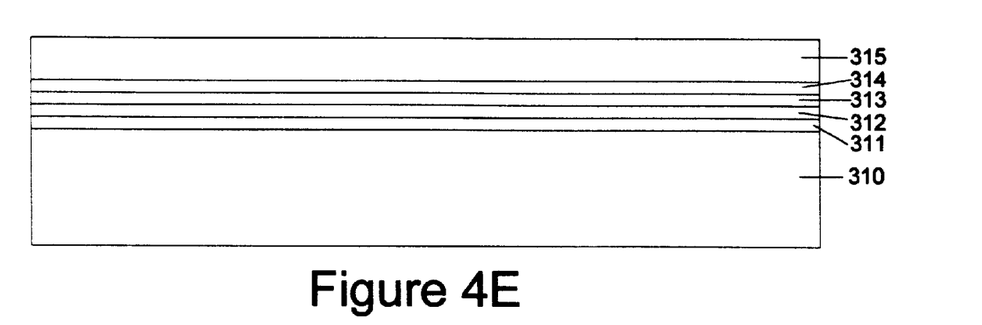

Referring to FIGS. 4C and 4D, a second inserting loss reduction layer for optical reflection enhancement is formed. The insertion loss reduction layer includes two layers of thin films 313 and 314. These two layers have different reflective index, n, the thin film with a smaller reflective index, 313, formed as a bottom layer near the substrate 310 to reduce the insertion loss and enhance reflection. The physical thickness t of the thin films 313 and 314 are determined by the film reflective index, n, and the wavelength $\lambda$ of the light for modulation according to the rule of $nt=m\lambda/4$, where m is an odd number. Again, a selection of m=3 is made to achieve a near-optimal mechanical performance. The films can be made of silicon oxide, or silicon nitride, or silicon oxynitride, or poly-silicon, or amorphous silicon, but preferably poly-silicon for layer 314, and silicon nitride for layer 313. Referring to FIG. 4E, a pole beam support layer, 315 is deposited on top of the second insertion loss reduction layers 313 and 314. The pole beam support layer 315 composed of phosphorus doped silicon or silicon oxide, or silicon carbide, but preferably phosphorus doped silicon.

Figure 4F:
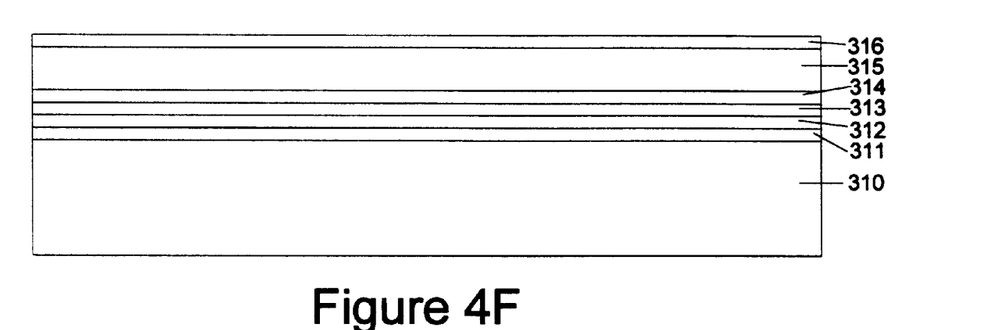

Referring to FIG. 4F, a first optical active and modulation membrane layer 316 is formed on top of the pole beam layer 315. The film physical thickness, t, is determined by the film reflective index, n, wavelength, $\lambda$, of the light for modulation according to the rule of $nt=m\lambda/4$, where m is an odd number. A selection of m=3 is made for near-optimal mechanical performance. The first optical active and modulation membrane layer 316 can be made of silicon oxide, or silicon oxynitride, or poly-silicon, or amorphous silicon, but preferably poly-silicon.

Figure 4G:
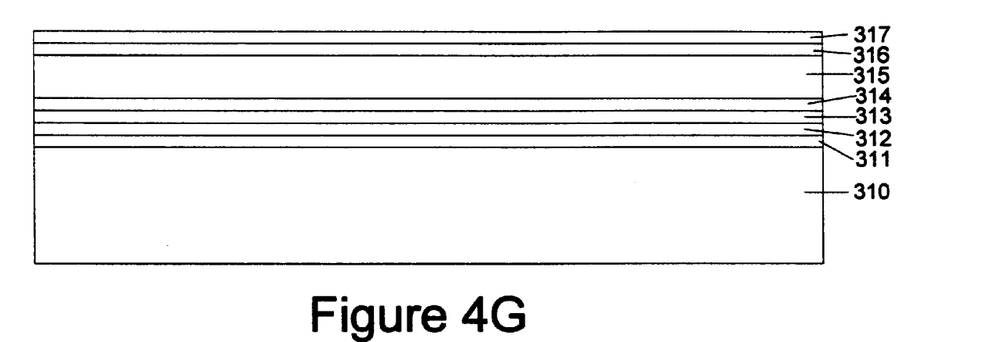

Referring to FIG. 4G, a second optical active and modulation membrane layer 317 is formed on top of the first optical active and modulation membrane layer 316. The film physical thickness, t, is determined by the film reflective index n and the wavelength, $\lambda$ of the light for modulation according to the rule of $nt=m\lambda/4$, where m is an odd number. Again, a selection of m=3 for the purpose of achieving a near-optimal mechanical performance. The second optical active and modulation membrane layer 317 can be made of silicon oxide, or silicon oxynitride, or poly-silicon, or amorphous silicon, but preferably silicon nitride.

Figure 4H:
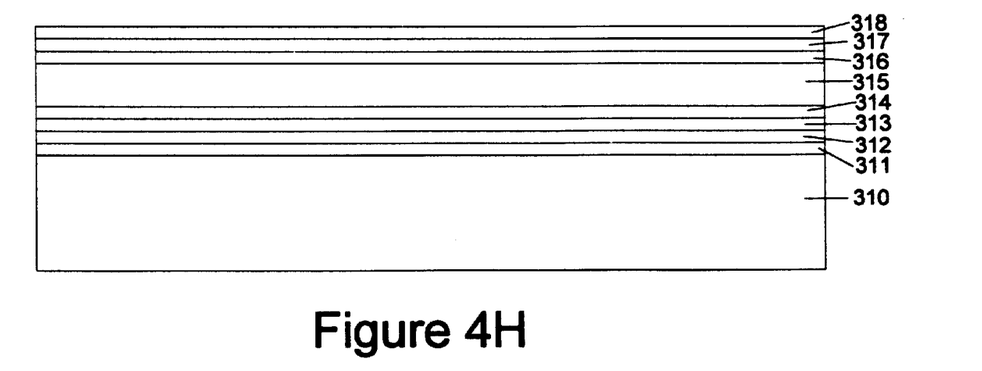

Referring to FIG. 4H, a third optical active and modulation membrane layer 318 is formed on top of the second optical active and modulation membrane layer 317. The third optical active and modulation membrane layer has a film thickness dependent on the film reflective index, n, and the wavelength, $\lambda$ of the light for modulation according to the rule of $nt=m\lambda/4$, where m is an odd number. A selection of m=3 is made for the purpose of achieving a near-optimal mechanical performance. The layer 318 can be made of silicon oxide, or silicon oxynitride, or poly-silicon, or amorphous silicon, but preferably poly-silicon.

Figure 4I:
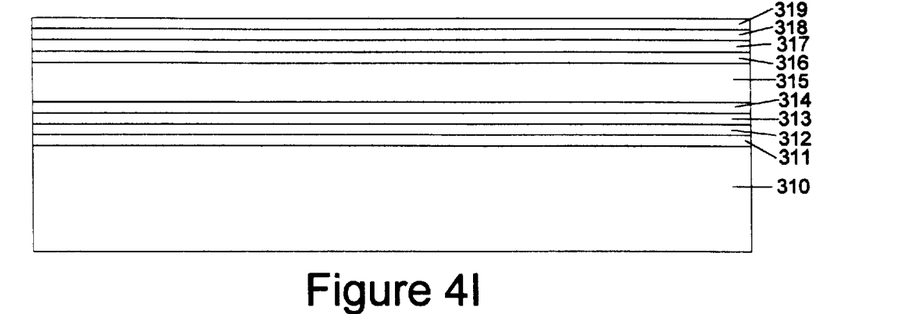

Referring to FIG. 4I, a fourth optical active and modulation membrane layer 319 is formed on top of the third optical active and modulation membrane layer 318. The fourth optical active and modulation membrane layer 319 has a film thickness dependent on the film reflective index, n, and the wavelength, λ, of the light for modulation according to the rule of nt=mλ/4, where m is an odd number. A selection of m=3 is made for the purpose of achieving a near-optimal mechanical performance. The layer 319 can be made of silicon oxide, or silicon oxynitride, or poly-silicon, or amorphous silicon, but preferably silicon nitride.

Figure 4J:
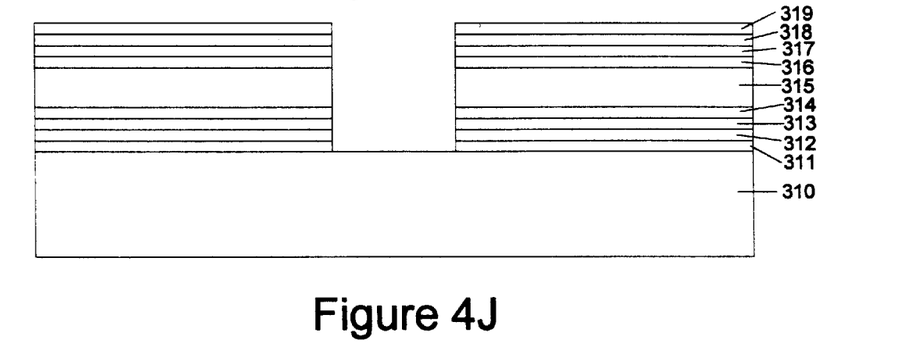
Figure 4K:
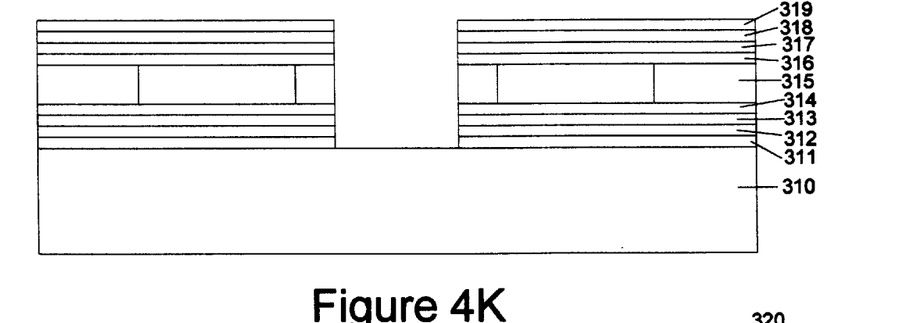
Figure 4L:
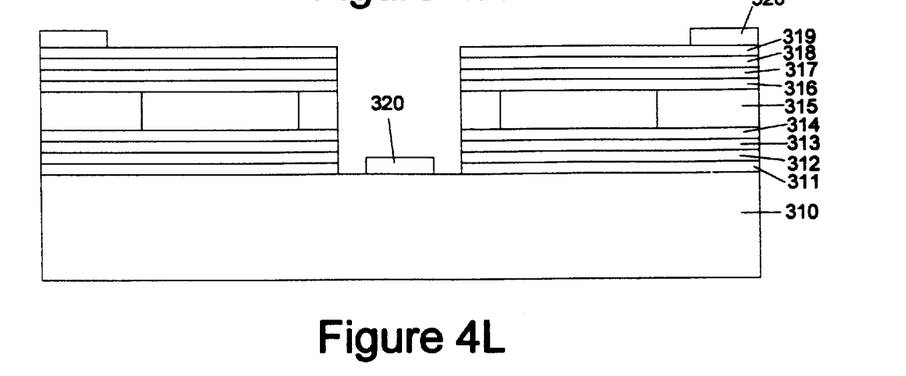

Referring to FIG. 4J, an etch process is carried out to open a trench 355 by applying a lithography and reactive ion etch processes to define the bottom electroplate areas 360. Then in FIG. 4K, a photolithography and reactive ion etch processes are first performed to define the membrane structure 365 at the pole beam layer 316 under the etch s top. Then, a wet etch process by employing a hydrofluoric (HF) etchant is carried out to undercut the PSG to lift the membrane. In FIG. 4L, an electroplating platinum and chromium or doped poly-silicon, but preferably gold and chromium.

Figure 5:
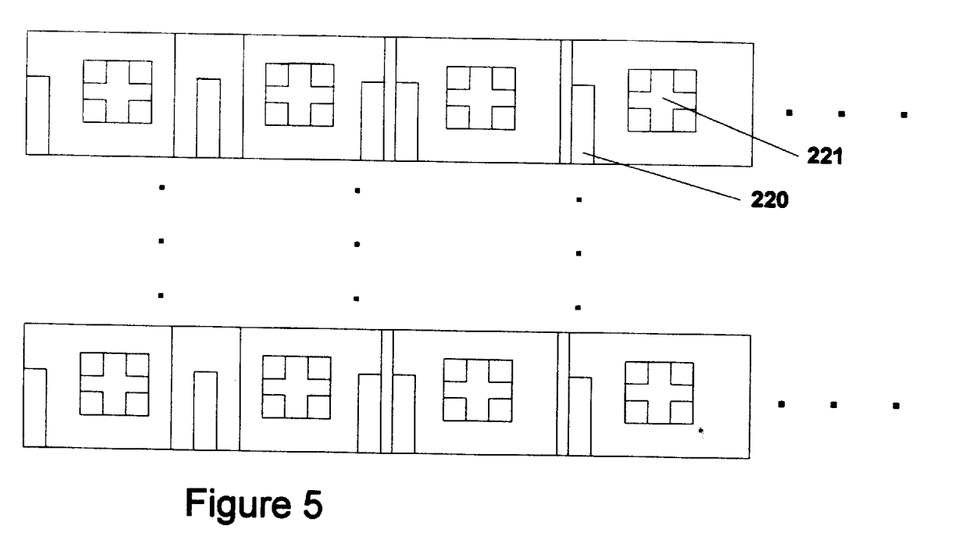
FIG. 5 is a top view of a two-dimensional array of a multi-channel attenuator device of this invention.

Referring to FIG. 5 for a two dimensional array of multi-channel optical attenuator devices formed with cross-shaped chambers manufactured according to above manufacturing processes. Each of these cross-shaped device has an optical active area 221 disposed at the center of the cross-shaped chamber. Each of these devices further includes an electrode pad 220.

According to FIGS. 2 and 3, this invention discloses an array of multi-channel optical attenuating devices. This array of multi-channel attenuating devices includes a plurality of electro-optical devices support on a conductive substrate. Each of these electro-optical devices includes a membrane having an optically transparent portion 221. Each of these electro-optical devices further includes a flexible support 115 for positioning the optically transparent portion 221 of the membrane spaced from the substrate for defining an air gap. The air gap constitutes a cross-shaped gap-chamber having a horizontally and vertically elongated chambers extended from a central intersection area. The central intersection area 221 constitutes an optical active area. Each of these electro-optical devices further includes a means 220 for applying an electrical bias between the conductive substrate and the membrane to adjust and control an air-gap thickness at the optical active area between the conductive substrate and the membrane. In a preferred embodiment, the plurality of electro-optical devises constitutes a one-dimensional array. In another preferred embodiment, the plurality of electro-optical devises constitutes a two-dimensional array. The air gap can be formed with symmetrical geometry relative to the optical transparent portion of the membrane. The layer structure and the thickness of different layers and the beam to optical window area-ratio are designed and arranged such that the excitations in high-frequency mode during electrical modulation are reduced. The array of attenuators is made on a single chip with center-to-center distance between the neighboring attenuators approximately 1.5 mm.

This invention further discloses an electro-optical device support on a conductive substrate. The electro-optical device includes a membrane having an array of transparent portions distributed over the membrane at predefined locations, each having an optically active area disposed substantially at a center of each of the transparent areas. The electro-optical device further includes a flexible support for positioning the array of transparent portions spaced from the substrate for defining an array of air gaps underneath each transparent portions wherein each of the gaps having a symmetrical geometry relative to the optically active area. The electro-optical device further includes a means for applying an electrical bias between the conductive substrate and the membrane to adjust an air-gap thickness at the optical active area between the conductive substrate and the membrane. In a preferred embodiment, each air gap disposed at a distance of approximately 15 millimeters from a center of the air gap to a center of a neighboring air gap. In another the substrate and the flexible support further comprising multiple layers having a layer structure and thickness for reducing a high frequency mode excitation in an electrical modulation of the membrane at each of the optically active areas. In a preferred embodiment, the substrate is supported on a single semiconductor chip. In another preferred embodiment, the array of air gaps constitutes a one-dimensional array distributed over the membrane along a single linear direction. In another preferred embodiment, the array of air gaps constitutes a two-dimensional array distributed over an area over the membrane. In another preferred embodiment, each of the air gaps is controlled by a separate means for applying an electrical bias for adjusting an air gap thickness.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An electro-optical device support on a conductive substrate comprising:

a membrane having an optically transparent portion;

a flexible support for positioning said optically transparent portion of said membrane spaced from said substrate for defining an air gap wherein said air gap constituting a cross-shaped gap-chamber having a horizontally and vertically elongated chambers extended from a central intersection area constituting an optical active area; and means for applying an electrical bias between said conductive substrate and said membrane to adjust an air-gap thickness at said optical active area between said conductive substrate and said membrane.

2. The electro-optical device of claim 1 further comprising:

at least an insertion loss reduction layer disposed on said substrate below said air gap for reducing an optical insertion loss.

3. The electro-optical device of claim 2 wherein:

said insertion loss reduction layer comprising a top layer and a bottom layer wherein a layer thickness t of said top and bottom layers satisfying a requirement of nt=mλ/4 where n is a reflection index of said top layer and bottom layer, λ is a wavelength and m is a positive integer.

4. The electro-optical device of claim 3 wherein:

said bottom layer of said insertion loss reduction layer having a smaller reflection index and said m is an odd positive integer.

5. The electro-optical device of claim 4 wherein:

said m=3 for said insertion loss reduction layer.

6. The electro-optical device of claim 5 further comprising:

a pole beam support layer disposed on top of said insertion loss reduction layer and said beam support layer surrounding and defining said cross-shaped gap-chamber.

7. The electro-optical device of claim 6 wherein:

said flexible support for positioning said membrane spaced from said substrate further comprising at least an optical active and modulation membrane layer for modulating an optical signal pass therethrough.

8. The electro-optical device of claim 7 wherein:

said optical active and modulation membrane layer having a layer thickness t satisfying a requirement of $nt=m\lambda/4$ where n is a reflection index of said optical active and modulation membrane layer, $\lambda$ is a wavelength and m is an odd positive integer.

9. The electro-optical device of claim 8 wherein:

said m=3 for said optical active and modulation membrane layer.

10. The electro-optical device of claim 9 wherein:

said flexible support for positioning said membrane spaced from said substrate further comprising a second optical active and modulation membrane layer.

11. The electro-optical device of claim 9 wherein:

said means for applying an electrical bias between said conductive substrate and said membrane comprising an electrode layer disposed on top of said optical active and modulation layer.

12. The electro-optical device of claim 1 further comprising:

an array of cross-shaped gap-chambers of claim 1 formed by a plurality of air gaps each defined by said membrane spaced from said substrate.

13. The electro-optical device of claim 12 wherein:

said array of cross-shaped gap-chambers constituting a one-dimensional array with each of said cross-shaped gap-chambers disposed at a predefined distance from a neighboring gap-chamber.

14. The electro-optical device of claim 12 wherein:

said array of cross-shaped gap-chambers constituting a two-dimensional array with each of said cross-shaped gap-chambers disposed at a predefined distance from each of a plurality of neighboring gap-chambers.

15. The electro-optical device of claim 12 wherein:

each of said array of cross-shaped gap-chambers includes a means for applying an independent electrical bias between said conductive substrate and said membrane for each of said cross-shaped gap-chambers to independently adjust an air-gap thickness at said optical active area between said conductive substrate and said membrane for each of said cross-shaped gap-chambers.

16. An electro-optical device support on a conductive substrate comprising:

a membrane having two-dimensional array of transparent portions distributed over said membrane at predefined locations, each having an optically active area disposed substantially at a center of each of said transparent portions;

a flexible support for positioning said array of transparent portions spaced from said conductive substrate for defining two-dimensional array of air gaps underneath each transparent portions, wherein each of said gaps having a symmetrical geometry relative to said optically active area; and a control means for applying an electrical bias between said conductive substrate and said membrane to adjust an air-gap thickness for each of said two-dimensional array of air-gaps at said optically active area between said conductive substrate and said membrane for simultaneously adjusting an optical transmission through each of said two-dimensional array of air-gaps;

each air gap of said two-dimensional array of air gaps disposed at a distance of approximately 15 millimeters from a center of said air gap to a center of a neighboring air gap.

17. The electro-optical device of claim 16 wherein:

said substrate and said flexible support further comprising multiple layers having a layer structure and thickness for reducing a high frequency mode excitation in an electrical modulation of said membrane at each of said optically active areas disposed above each of said two-dimensional array of air-gaps.

\* \* \* \* \*